United States Patent [19]

Hyakutake et al.

[11] Patent Number: 4,975,259
[45] Date of Patent: Dec. 4, 1990

[54] METHOD OF LIQUEFYING AND CONDENSING NITROGEN TRIFLUORIDE AND A METHOD OF PURIFYING NITROGEN TRIFLUORIDE

[75] Inventors: Hiroyuki Hyakutake, Kanagawa; Isao Harada, Yamaguchi; Naruyuki Iwanaga, Yamaguchi; Toshihiko Nishitsuji, Yamaguchi, all of Japan

[73] Assignee: Mitsui Toatsu Chemicals, Inc., Tokyo, Japan

[21] Appl. No.: 382,788

[22] PCT Filed: Nov. 4, 1988

[86] PCT No.: PCT/JP88/01120
§ 371 Date: Jun. 26, 1989
§ 102(e) Date: Jun. 26, 1989

[87] PCT Pub. No.: WO89/04444
PCT Pub. Date: May 18, 1989

[30] Foreign Application Priority Data

Nov. 4, 1987 [JP] Japan ................. 62-277514

[51] Int. Cl.$^5$ ............... B01D 5/00; C01B 21/083; F25J 3/00
[52] U.S. Cl. .................. 423/406; 55/23; 55/69; 55/71; 62/11; 62/22
[58] Field of Search ........ 204/63; 423/406; 55/71, 55/69, 23, 24, 66; 62/11, 22, 32

[56] References Cited

U.S. PATENT DOCUMENTS

| | | | |
|---|---|---|---|
| 3,181,305 | 5/1965 | Schoenfelder | 423/406 |
| 3,235,474 | 2/1966 | Thompkins et al. | 204/63 |
| 4,543,242 | 9/1985 | Aramalli et al. | 423/406 |
| 4,804,447 | 2/1989 | Sartori | 204/63 |

FOREIGN PATENT DOCUMENTS

| | | | |
|---|---|---|---|
| 1963297 | 12/1969 | Fed. Rep. of Germany | 62/11 |
| 8926 | 3/1980 | Japan . | |
| 21724 | 1/1987 | Japan . | |

*Primary Examiner*—Jeffrey E. Russel
*Assistant Examiner*—Brian M. Bolam
*Attorney, Agent, or Firm*—Fisher, Christen & Sabol

[57] ABSTRACT

The present invention has as its technical theme to provide a liquefactive and condensable method that enables the reaction step of forming $NF_3$ to be operated safely and continuously and purifying method that eliminates $O_2$, $N_2$, etc. in $NF_3$.

The present invention is directed to a method wherein liquefaction and condensation of $NF_3$ is carried out with an additive gas such as He, and Ne introduced in order to prevent $H_2$ from mixing. The present invention is also directed to a purifying method wherein deeply cooled distillation of liquefied $NF_3$ is carried out with one or more of He, He, and Ar introduced as a third component gas.

According to the present invention, a safe long-term continuous operation has been made possible. Since $O_2$, $N_2$, etc. in $NF_3$ can be eliminated efficiently, highly pure $NF_3$ can be obtained.

18 Claims, 5 Drawing Sheets

METHOD OF LIQUEFYING AND CONDENSING NITROGEN TRIFLUORIDE AND A METHOD OF PURIFYING NITROGEN TRIFLUORIDE

TECHNICAL FIELD

The present invention relates to a method of liquefying and condensing nitrogen trifluoride (hereinafter referred to as $NF_3$) formed in the production of $NF_3$ and to a method of purifying $NF_3$ formed in the production of $NF_3$.

BACKGROUND ART $NF_3$ is a colorless gas having such physical properties that the boiling point is $-129°$ C., and the melting point is $-208°$ C.

Since the activity of $NF_3$ is suitably weak as a fluorine source in comparison with fluorine ($F_2$), and the toxicity thereof is low, conventionally $NF_3$ was used as a fluorine source in adjusting fluoroolefins, and was used as an oxidizing agent of high energy fuels. Also, in recent years, $NF_3$ as a cleaning agent for CVD apparatuses in the field of electronic materials as well as as a dry etching gas for very large-scale integrated circuits has become to be used.

There are many processes for the production of $NF_3$. As major processes thereof can be mentioned, for example, a molten salt electrolytic process using an ammonium acid fluoride (U.S. Pat. No. 3,235,474), a process wherein an ammonium acid fluoride in a molten state is reacted with gaseous fluorine (Japanese Patent Publication No. 8926/1980), and a process wherein an ammonium complex of a metal fluoride in the solid state is reacted with $F_2$ in the elemental state (Japanese Patent Publication No. 21724/1987).

In any of these processes, in the reaction step of producing $NF_3$, it is required that an inert gas is introduced as a carrier gas into the reaction system in order to prevent explosion to improve the safety or in order to control the reaction suitably, and as this inert gas, inexpensive nitrogen ($N_2$) gas is employed in most cases. Even in the case wherein the reaction is carried out without making a particular introduction of a carrier gas from the outside, in any of the above processes, $N_2$ gas is formed as a by-product, and remains mixed in the formed $NF_3$ gas.

Therefore, when $NF_3$ produced in any of the above processes is to be used for various applications as mentioned above, it is required to eliminate impurities such as $N_2$ gas, nitrous oxide ($N_3O$), and carbon dioxide ($CO_2$). However, since generally $N_2$ gas ($N_2$ gas as a carrier gas, and $N_2$ gas as a by-product) is contained in a considerable amount in the $NF_3$ produced in any of the above processes, in order to eliminate the $N_2$ gas, the so-called $NF_3$ condensing step wherein the $N_2$ gas is eliminated after the reaction step is joined to follow the reaction step. (Note that, in some cases, a purifying step of eliminating impurities other than $N_2$ gas such as $N_2O$ and $CO_2$ as mentioned above, and hydrogen fluoride (HF) that has remained unreacted or has been produced as a by-product is also placed between the reaction step and the condensation step.)

In this case, although there are various ways of condensing $NF_3$, a process of liquefying $NF_3$ using a refrigerant is commonly used as the most effective process since impurities will not be introduced and the facilities are simple in comparison with other processes wherein compression by using a compressor is effected. As the refrigerant for liquefying, use is made of a liquefied gas having a boiling point lower than that of $NF_3$ such as liquid nitrogen, liquid air, and liquid argon, and when, of these, liquid nitrogen is used, it is the most preferable because, for example, the condensation of $NF_3$ becomes easy, $N_2$ is an inert substance, therefore the use thereof is safe, and $N_2$ is inexpensive.

However, in the case wherein $NF_3$ is produced by using apparatus including the production steps as mentioned above, when the $NF_3$ formed in the condensation step is cooled and liquefied by using liquid nitrogen as a refrigerant, because $N_2$ gas that is a carrier gas and $N_2$ gas that has been formed as a by-product are also partly liquefied together with $NF_3$, the pressure in the condensation step is decreased, and the pressure in the whole reaction system is also decreased.

Since the formation reaction of $NF_3$ is carried out continuously, such a state makes quite difficult the control of the reaction in the reaction step, and safety problems arise, making impossible the reaction to be continued for a long period of time.

This is described using the molten salt electrolytic process as an example as follows. For example, in the case wherein, in order to produce $NF_3$, a molten salt electrolysis is carried out in an $NH_4F/HF$ system using, as raw material, acid ammonium fluoride or ammonium fluoride and hydrogen fluoride or a $KF/NH_4F/HF$ system that is formed by adding as a raw material, acid potassium fluoride or potassium fluoride to the $NH_4F/HF$ system, $NF_3$ gas is released from the anode of the electrolytic cell while $H_2$ gas is released from the cathode.

Figure 3:
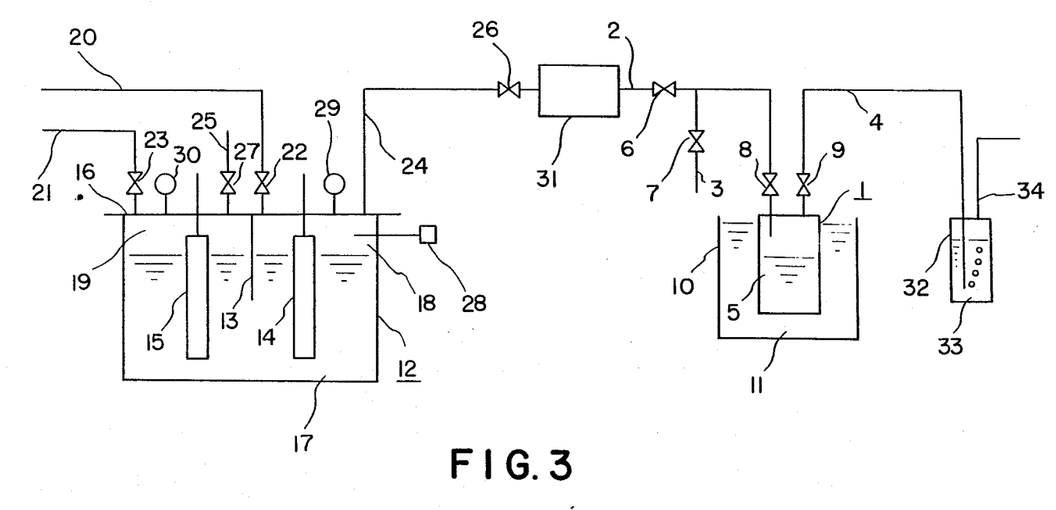
FIG. 3 is a flow sheet, showing a reaction apparatus, and a liquefying/condensing apparatus of the apparatus for producing $NF_3$ used in the Examples and a Comparative Example.

If the $NF_3$ gas and the $H_2$ gas are mixed, they will explode, and therefore, in order to avoid the mixing, as shown in FIG. 3, the electrolytic cell is provided with a partition 13 for separating the anode 14 and the cathode 15 in such a manner that the partition 13 is fixed to a lid plate 16 with a suitable distance between it and the bottom plate of the electrolytic cell, so that the electrolytic cell is formed with an anode chamber 18 and a cathode chamber 19 (the partition is positioned in such a way that the electrolyte can move freely between the anode chamber and the cathode chamber at the bottom part of the electrolytic cell.) to prevent the $NF_3$ gas and the $H_2$ gas from mixing. In order to prevent the partition at the time of the electrolysis from having a bipolarization phenomenon, the partition is made of a fluorocarbon resin or has the surfaces coated with a fluorocarbon resin.

As the fluorocarbon resin used for the partition in the present invention, any of generally known ones can be suitably used such as polytetrafluoroethylene, polychlorotrifluoroethylene, polyvinylidene fluoride, polyvinyl fluoride, tetrafluoroethylene/hexafluoropropylene copolymer, tetrafluoroethylene/ethylene copolymer, tetrafluoroethylene/perfluoroalkylvinyl ether copolymer, and chlorotrifluoroethylene/ethylene copolymer.

The $NF_3$ gas and the $H_2$ gas released respectively from the anode chamber and the cathode chamber of the electrolytic cell are led to the outside of the system, and then the $NF_3$ gas is led to the next step, that is, the condensation step while the $H_2$ gas is utilized as a by-product or is burnt and then released into the atmosphere. Therefore it is impossible to keep the pressure in the anode chamber and the pressure in the cathode chamber at the same level all the time, resulting in a pressure difference. As a result, the level of the electrolyte in the anode chamber becomes different from the level of the electrolyte in the cathode chamber.

As the pressure difference becomes great, the difference in the level of the electrolyte surface becomes greater between the anode chamber and the cathode chamber, and when this difference exceeds a certain limit, either the $NF_3$ gas or the $H_2$ gas passes below the partition, and then mixes with the other gas thereby leading in the end to formation of a gas within the explosion limit. In order to obviate this, an inert gas is introduced as a carrier gas into the anode chamber and the cathode chamber of the electrolytic cell respectively in suitable amounts to control the difference. Thus, the term "carrier gas" means a gas that is fed into the reaction tank for the purpose of improving the safety and controlling the reaction.

In this case, as the carrier gas, a gas that is inert to $NF_3$ gas and $H_2$ gas, and can be easily separated from the $NF_3$ gas in the subsequent purifying step for example $N_2$, or Ar is used, and since, of these gases, $N_2$ gas is inexpensive, it is preferable. Further, in the molten salt electrolytic process, since $N_2$ is formed as a by-product in a considerable amount in the reaction step, and the thus formed $N_2$ interfuses into the produced $NF_3$, it is also preferable to use $N_2$ gas as the carrier gas.

The $NF_3$ gas continuously produced in the electrolytic cell is then cooled with liquid nitrogen as stated above to be liquefied and condensed. (It should be noted that, in the case of the molten salt electrolytic process, since for example hydrogen fluoride, etc. are included as unreacted material, it is preferable that a purifying step of eliminating the hydrogen fluoride, etc. is placed between the reaction step and the liquefying/condensing step.)

However, since, in this liquefying/condensing step, the $N_2$ gas introduced as a carrier gas into the electrolytic cell in the reaction step is also partly liquefied, the pressure in the liquefying/condensing apparatus decreases, and due to this the pressure in the anode chamber of the electrolytic cell also decreases, leading to a pressure difference between the anode chamber and the cathode chamber. As a result, for the same reason as stated before, the hydrogen gas will mix into the $NF_3$ gas formed in the anode chamber thereby forming an explosive gas.

Since it is impossible to prevent completely the drop of the pressure in the anode chamber that will lead to the formation of the explosive gas only by the control of the supply of $N_2$ gas into the anode chamber, there is a serious problem that the operation cannot be continued for a long period of time to produce $NF_3$.

Therefore, it is desired to develop a method that can solve the above-mentioned problems, is safe, and can produce $NF_3$ continuously for a long period of time, and more specifically to develop a method of recovering $NF_3$ by liquefaction and condensation from a mixed gas of $NF_3$ obtained by a molten salt electrolytic process and a carrier gas.

$NF_3$ is produced by the various processes as mentioned above, and generally the thus produced $NF_3$ contains relatively large amounts of impurities such as nitrous oxide ($N_2O$), carbon dioxide ($CO_2$), oxygen ($O_2$), and nitrogen ($N_2$) Therefore, for example, when the $NF_3$ is to suitably be used as a cleaning agent for CVD apparatuses in the field of electronic materials or as a dry etching agent or the like in the production of LSI's, it is required that the above-mentioned impurities are eliminated as far as possible to make the $NF_3$ highly pure.

As a method of eliminating the above-mentioned impurities, usually a method is used wherein the $NF_3$ is brought in contact with an adsorbent such as zeolites thereby eliminating the impurities, because the method is the most effective and simple. However, although the treatment with a zeolite can eliminate efficiently impurities having relatively high boiling points such as $N_2O$, and $CO_2$ present in the $NF_3$, the treatment can hardly eliminate components having relatively low boiling points such as $O_2$, and $N_2$, and a method of eliminating them has not yet been known.

Although distillation technique is effective and is commonly used generally as means of separating components having different boiling points, when the inventors attempted distillation technique to eliminate low-boiling components in the $NF_3$, the low-boiling components could not efficiently be separated in spite of the fact that there is a sufficient difference in the boiling point between $NF_3$ and the low-boiling components, and it was found that for example $N_2$ remained in an amount of at least as much as thousands ppm in the $NF_3$.

Development of a method of eliminating efficiently low-boiling components such as $O_2$, and $N_2$ to yield highly pure nitrogen fluoride is desired.

DISCLOSURE OF THE INVENTION

A first object of the present invention is to provide a method capable of producing $NF_3$ safely and continuously for a long period of time in the production of $NF_3$, and to provide a process of recovering highly pure $NF_3$ gas from a mixed gas of $NF_3$ gas and a carrier gas in a liquefying/condensing step.

A second object of the present invention is to provide a method of eliminating efficiently low-boiling impurities such as $O_2$, and $N_2$ from the produced $NF_3$, and capable of producing $NF_3$ having an ultra-high purity of 99.99 wt. %, or so-called four-nines % pure $NF_3$.

The present invention is directed to a method of liquefying and condensing nitrogen trifluoride, wherein a mixed gas of nitrogen trifluoride gas and a carrier gas is led into a cooling step, the mixed gas is cooled in the cooling step in the copresence of a gas whose boiling point is lower than that of nitrogen gas, and which is not dissolved in liquid nitrogen trifluoride thereby obtaining liquefied nitrogen trifluoride mainly comprising nitrogen trifluoride, and the thus obtained liquefied nitrogen trifluoride is recovered.

As the gas whose boiling point is lower than that of nitrogen gas and that is not dissolved in liquid nitrogen trifluoride, preferably use is made of helium or neon. The gas whose boiling point is lower than that of nitrogen gas and that is incompatible with nitrogen trifluoride is added in the liquefying/condensing step, and also includes the carrier gas containing helium or neon that has been present in the reaction tank, or helium and/or neon itself that has been added itself as a carrier gas, and thus the term "in the copresence" means this.

The present invention is also directed to a method of purifying nitrogen trifluoride that comprises subjecting liquefied nitrogen trifluoride to deeply cooled distillation in the copresence of a third component gas whose boiling point is lower than that of nitrogen trifluoride and that is not dissolved in liquid nitrogen trifluoride.

In the present invention, when a mixed gas of $NF_3$ and a carrier gas is led into a step (liquefying/condensing step) of cooling $NF_3$ joined after a reaction step of forming NF₃, particularly joined after a reaction step of forming NF₃ by an molten salt electrolytic process, and the NF₃ is liquefied and condensed, the liquefaction/condensation is carried out in the copresence of a gas whose boiling point is lower than that of nitrogen gas, and that is not dissolved in liquid. The term "in the copresence" is intended to mean that the gas whose boiling point is lower than that of nitrogen gas, and that is incompatible with NF₃ may include, in addition to one added in the liquefaction/condensation step, one that has been added to the carrier gas, or one that has served as the carrier gas itself.

In the present invention, as the gas whose boiling point is lower than that of nitrogen gas, and that is not dissolved in liquid NF₃ is preferably used for example helium (He), or neon (Ne). The gas whose boiling point is lower than that of nitrogen gas, and that is not dissolved liquid NF₃, i.e., a gas other than nitrogen, is hereinafter referred to as an additive gas.

The additive gas may comprise a single gas or a mixed gas of one or more gases.

In the present invention, as the apparatus for liquefying and condensing NF₃, generally use is made of an apparatus comprising a closed container for collecting liquefied NF₃ equipped with a gas inlet and a gas discharge outlet (hereinafter referred to as a collecting container), and a refrigerant tank for cooling the collecting container. In order to avoid allowing air to enter the collecting container due to the back-flow of the additive gas, the N₂ gas as a by-product, and the carrier gas (usually N₂ gas) used in the reaction step that are to be discharged, it is preferable that a sealing tank filled with a liquid inert to these gases such as water is provided at the tip of the gas discharge outlet, and after these gases to be discharged are bubbled through the liquid in the sealing tank, they are discharged into the atmosphere.

In the present invention, the NF₃ gas formed in the reaction step containing the N₂ gas, the carrier gas which may contain He and/or Ne), etc. is cooled in the copresence of an additive gas to liquefy and condense the NF₃, and this operation is carried out under a pressure that is the same as or slightly higher than the normal pressures, and is lower than the pressure in the reaction step. It is preferable that the pressure is in the range of 0 to 0.5 kg/cm² G. The control of this pressure is carried out by the amount of the additive gas that is copresent (by the amount of the additive gas introduced into the reaction tank and/or the collecting container). However, since this additive gas is accompanied by part of the NF₃ when the additive gas is discharged outside of the system from the discharge outlet of the collecting container together with the carrier gas from the reaction step, in order to prevent the loss of NF₃ due to this accompaniment as far as possible, it is unfavorable to introduce, into the collecting container, an excess of the additive gas including, if added, the amount of the additive gas added to the carrier gas, and therefore generally the control of the pressure is carried out with the amount of the additive gas being 0.01 to 10 times by volume as much as the amount of the NF₃ gas generated in the reaction step. If the volume ratio is less than 0.01, the effect of the addition of the third component gas is not obtained, while if the volume ratio is over 10, the loss of NF₃ becomes great. The amount of NF₃ accompanying the discharged gases is also affected by the cooling/condensing temperature of the NF₃, and it is preferable that this temperature is as low as possible within the below mentioned range. That is, the temperature range is up to the liquefying temperature of NF₃ and down to the liquefying temperature of N₂ gas. In other words, the temperature range is preferably −129° C. to −196° C.

Figure 1:
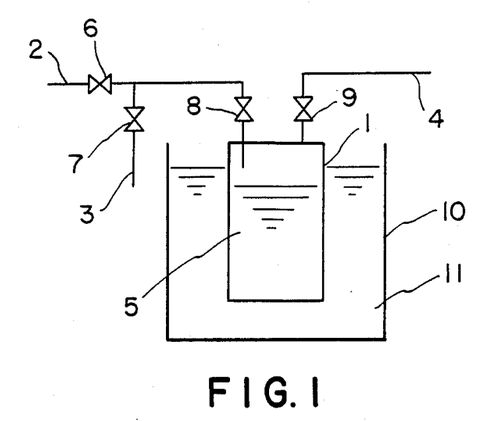
FIGS. 1 and 2 are explanatory diagrams, showing Examples of the present method of introducing an additive gas into a collecting container for liquefying and condensing $NF_3$ is liquefied and condensed.
Figure 2:
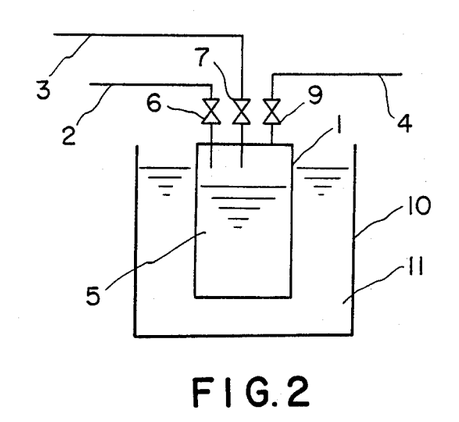

There is no particular limitation on the method of introducing the additive gas used in the present invention into the collecting container, thus various methods can be used, and there is a method wherein He and/or Ne is used as the carrier gas itself, or a method wherein He and/or Ne is previously mixed with the carrier gas that is for example N₂. If the additive gas is added in the liquefying/condensing step, it is carried out simply for example as shown in FIG. 1 by a method wherein an introducing pipe 3 of the additive gas is connected to an introducing pipe 2 of the gas (a mixed gas consisting of NF₃, N₂, the carrier gas, etc.) generated in the reaction step that extends to the collecting container 1, or as shown in FIG. 2 by a method wherein an introducing pipe 2 of the reaction gas, and a introducing pipe 3 of the additive gas are provided separately to the collecting container 1 to introduce them into the collecting container 1. It is preferable that the introducing pipes to the collecting container 1 are not placed into the liquefied NF₃ in the collecting container 1.

Since the liquefied NF₃ that has thus been recovered by the liquefaction/condensation still contains relatively large amounts of impurities that are components having relatively high boiling points such as N₂O, and CO₂, and components having relatively low boiling points such as O₂, and N₂, it is required that the NF₃ is freed from these impurities to be purified. Of these impurities, N₂O, and CO₂ that are impurities having relatively high boiling points can be eliminated by a prior known method, wherein it is brought in contact with an adsorbent such as active alumina or a zeolite, more efficiently than by means of deeply cooled distillation. For that reason, it is preferable that, before or after deeply cooled distillation, the NF₃ is brought in contact with an adsorbent such as active alumina or a zeolite so that NO₂ and CO₂ may be eliminated.

A method of eliminating N₂O, CO₂, HF, etc. that are relatively-high boiling point impurity components by using active alumina as an adsorbent is described in more detail as an example. If a zeolite is used, the method is carried out in the same way.

It is preferable to use active alumina having a particle size of 8 to 12 mesh. The temperature is 0° to −125° C., the pressure is 0 to 5 kg/cm² G, the contact time is 10 sec to 1 min, and generally the gas is passed through a packed column loaded with active alumina, so that impurities are adsorbed and eliminated.

There is no particular limitation on active alumina, and although any active alumina that is usually commercially available can be used, it is preferable to use one in the form of particles having a higher surface area that has been heated to 250° to 900° C., preferably 250° to 600° C. to be dehydrated. If this temperature is lower than 250° C., water remains in the active alumina, and when NF₃ gas is passed through the active alumina layer, the ability to eliminate N₂O, and CO₂ lowers.

In contrast, if the temperature is higher than required, it is not preferable because such problems arise that not only the energy is lost, but also the container for heat-treating the active alumina such as the column is attacked.

Although the dehydration treatment of active alumina by heating may be carried out in air, it is preferable that the dehydration treatment is carried out under a flow of an inert gas such as nitrogen gas free from water since the heating is effected for the purpose of evaporating the water contained in the active alumina, and also it is preferable the dehydration treatment is carried out under reduced pressure while the gas is sucked. Although it is enough if the heating is carried out for 30 min at the above-mentioned temperature and in the above-mentioned atmosphere, generally the heating is carried out for 1 to 2 hours to make the dehydration sure.

The active alumina that has been dehydrated by heating is cooled below normal temperatures by standing or with force, and, in this case, it must be avoided that water comes into the alumina. Therefore, to do that, it is preferable that the dehydration treatment of active alumina by heating is carried out with the active alumina loaded for example in a column, then after the dehydration the column is cooled, and $NF_3$ gas is passed through the active alumina layer.

It is preferable that the temperature at which the $NF_3$ gas is passed is as low as possible, and generally the temperature that is used is 0° C. or below. However, since the boiling point of $NF_3$ is $-129°$ C., the operation becomes difficult in practice if the temperature is at or below $-129°$ C. Therefore, $NF_3$ gas is passed at 0° to $-125°$ C. in the present invention.

Although the pressure of the $NF_3$ gas under which the $NF_3$ is passed is not particularly limited, the pressure is preferably, for example, on the order of 0 to 5 kg/cm$^2$ G because that pressure is easy to handle.

The concentration ranges of impurities in the $NF_3$ before and after the treatment with active alumina are as follows: $N_2O$, 0.1 to 1%, $CO_2$, 0.1 to 1%, $O_2$, 0.1 to 1%, and $N_2$, 0.1 to 1%, in the crude $NF_3$ before the treatment with active alumina; and $N_2O$, 0.1 to 10 ppm, $CO_2$, 0.1 to 10 ppm, $O_2$, 0.1 to 1%, and $N_2$, 0.1 to 1%, in the $NF_3$ after treatment with active alumina. That is, low-boiling impurities such as $O_2$, and $N_2$ cannot be eliminated by adsorption on active alumina.

Although, of the above two purification methods, either one can be carried out first, generally after $N_2O$, and $CO_2$ that are relatively-high boiling components are brought in contact with active alumina to be eliminated, low-boiling components are eliminated by the present deeply cooled distillation method.

In the present invention, as stated above, preferably $N_2$ and $CO_2$ that are relatively-high boiling components are eliminated previously, and then the $NF_3$ gas containing as main impurity gas $O_2$ and/or $N_2$ is cooled to be liquefied.

Although as the refrigerant used for the liquefaction can be used a material whose boiling point is lower than that of nitrogen fluoride such as liquid nitrogen, liquid air, liquid argon, and LNG, of these gases, liquid nitrogen is the most preferable because it is inexpensive and inert.

For example, it is favorable to combine the liquefaction with a process of vaporizing LNG because the energy can be saved. Also a method wherein the heat of the refrigerant of the refrigerator is exchanged directly for the heat of the crude $NF_3$ can be effectively employed. If purification is carried out after the production of $NF_3$, this liquefying step is not required because the liquefied $NF_3$ obtained in the liquefying/condensing step in the production step can be obtained as raw material directly.

In the present invention, the thus liquefied $NF_3$ is subjected to deeply cooled distillation so that the $NF_3$ may be freed from low-boiling components such as $O_2$, and $N_2$ contained therein and purified, and when the deeply cooled distillation is carried out, a third component whose boiling point is lower than that of $NF_3$ and that is not dissolved in liquid $NF_3$ is made copresent. As such a third component, helium, neon, and argon can be exemplified. The third component may comprise a single gas or a mixture of two or more gases.

Figure 4:
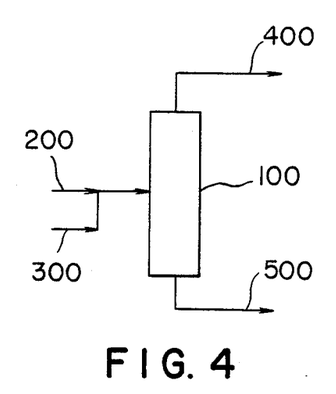
FIGS. 4 to 9 are explanatory diagrams, showing distillation apparatuses illustrating the mode of each Example of the present invention.
Figure 5:
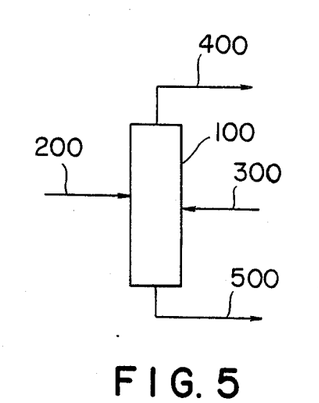
Figure 6:
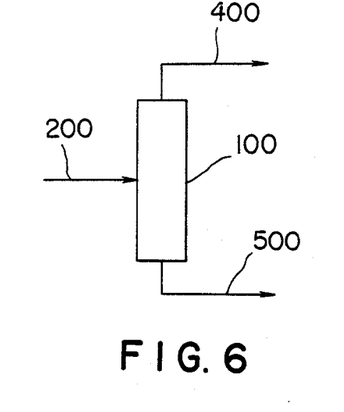
Figure 7:
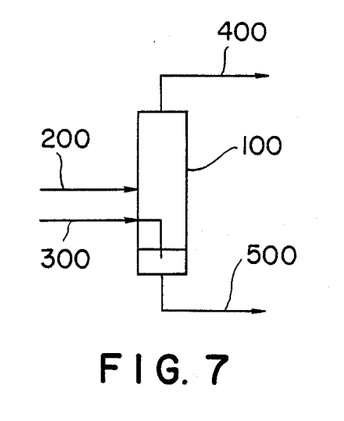
Figure 8:
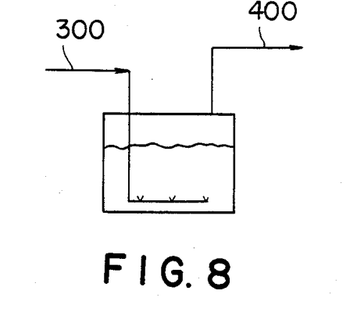
Figure 9:
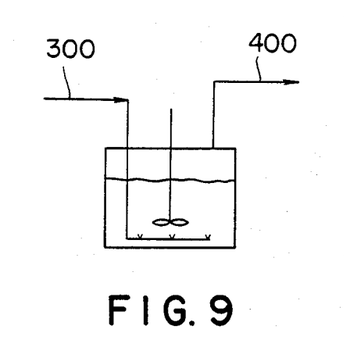

In the present invention, as a specific method of making the third component copresent in the crude $NF_3$, various methods can be used such as a method wherein the third component is fed together with the crude $NF_3$ into the distillation column as shown in FIG. 4, a method wherein the crude $NF_3$ and the third component are fed into the distillation column through separate feeding ports as shown in FIG. 5, a method wherein after the inside atmosphere of the distillation column is replaced with the third component, the crude $NF_3$ is fed into the distillation column as shown in FIG. 6, or a method wherein the third component in the gaseous form is bubbled through the crude $NF_3$ liquefied and staying in the bottom of the distillation column as shown in FIG. 7. Of these methods, the method wherein the third component in the gaseous form is bubbled through the crude $NF_3$ liquefied and staying in the bottom of the distillation column is particularly preferable because the efficiency of eliminating low-boiling components such as $O_2$ and $N_2$ is high. Although the methods shown in FIGS. 4 to 7 are of continuous distillation type, if the method is carried out batch-wise, a method as shown in FIG. 8 wherein the third component in the gaseous form is bubbled through the liquefied crude $NF_3$, or a bubble stirring method as shown in FIG. 9 wherein a stirring machine is provided to stir the crude $NF_3$ is preferable because the efficiency of eliminating low-boiling components is high. When the method wherein the third component in the gaseous form is bubbled through the $NF_3$ in the liquid form is used, the more finely dispersed the bubbles, the higher the efficiency of eliminating low-boiling components, and therefore it is preferable to use a dispersing nozzle for bubbling the third component.

Figure 10:
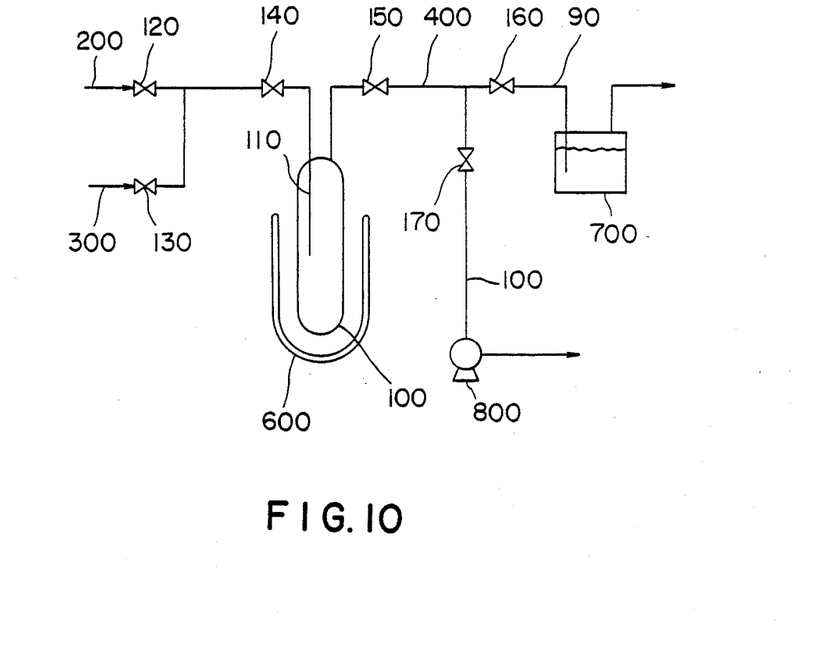
FIG. 10 is a flow sheet, showing the distillation apparatus used in Examples and Comparative Examples.

When the deeply cooled distillation is carried out under normal pressures in any one of the above methods, it is required to prevent air from coming into the distillation apparatus system. FIG. 10 is a diagram showing a detailed mode of carrying out the methods given in the above drawings, and if the deeply cooled distillation is effected under normal pressures, the low-boiling components and the third component are discharged into the atmosphere after they are bubbled through a water sealing tank provided on their way, so that air can be prevented from coming into the distillation apparatus system.

In the present invention, the deeply cooled distillation is carried out at a temperature at which part of the $NF_3$ is in the liquid state, that is, at a temperature ranging between up to the liquefying temperature of $NF_3$ and down to the solidifying temperature of $NF_3$ and at which the copresent third component will not liquefy. Consequently, the crude $NF_3$ must be in a state partly liquefied in the distillation column, and this can be done by cooling the distillation column with a refrigerant such as liquid nitrogen, liquid air, and liquid argon and insulating the distillation column. At the time when the crude $NF_3$ is fed to the distillation column, although it is not necessarily required that the crude $NF_3$ is in the liquefied state, and the crude $NF_3$ may be in the gaseous state, it is preferable that the crude $NF_3$ is fed to the distillation column with it being in the liquefied state because the loss of $NF_3$ can be prevented as far as possible in that case.

In the present invention, although the operation is simple when the distillation is carried out with the pressure in the distillation column under normal pressures, it is preferable to carry out the distillation under reduced pressure in order to improve the efficiency of eliminating low-boiling components, and the higher the vacuum, the higher the efficiency of elimination. As means of reducing the pressure in the distillation column, use can be made, for example, of a method wherein suction is carried out from the top of the distillation column by using a commonly known decompression device such as a vacuum pump or an aspirator, or a method wherein the mixed gas of the third component and the low-boiling components discharged from the top of the distillation column is liquefied by using liquid helium.

Although there is no particular limitation on the amount of the third component that is made copresent in the crude $NF_3$ when the deeply cooled distillation is carried out, the larger the amount of the third component is, the better it is, in view of the effect of elimination of low-boiling components such as $O_2$, and $N_2$. However, the third component is accompanied by part of the $NF_3$ when it is discharged outside of the system together with the low-boiling components from the top of the distillation column. Therefore, as the copresent amount of the third component is increased, the amount of the loss of the $NF_3$ increases, so that it is preferable in practice that the volume ratio of the third component in the gaseous state to the crude $NF_3$ in the liquid state is in the range of from 0.01 to 10. If the volume ratio is less than 0.01, the effect of the addition of the third component gas cannot be observed similarly to the case of the liquefying/condensing step, while if the volume ratio is over 10, it is not preferable because the loss of $NF_3$ becomes great. There is no particular limitation on the way of feeding the third component to the distillation column, and the third component can be fed to the distillation column continuously, batch-wise or intermittently.

Gases other than $NF_3$, such as $N_2F_2$ or $N_2F_4$ can also be applied equivalently to the present purifying method.

BRIEF DESCRIPTION OF THE DRAWINGS

wherein the reference numerals account for the following, respectively:
 1: a collecting container,
 2: an introducing pipe of the gas generated in the reaction step,
 3: an additive gas introducing pipe,
 4: an exhaust pipe,
 5: liquefied $NF_3$, 6, 7, 8, and 9: valves,
 10: a refrigerant tank,
 11: a refrigerant,
 12: an electrolytic cell,
 13: a partition,
 14: an electrode (anode),
 15: an electrode (cathode),
 16: a lid plate,
 17: an electrolytic bath,
 18: an anode chamber,
 19: a cathode chamber,
 20: and 21: carrier gas introducing pipes,
 22, 23: valves,
 24: a piping,
 25: a hydrogen gas discharging pipe,
 26, and 27: valves,
 28: a hydrogen gas concentration meter,
 29, and 30: pressure gauges,
 31: an HF eliminating apparatus,
 32: a sealing tank,
 33: a sealing liquid, and
 34: an exhaust gas atmosphere discharging pipe.

wherein the reference numerals account for the following, respectively:
 100: a distillation column or collecting container,
 200: a crude nitrogen fluoride feed line,
 300: a third component feed line,
 400: a low-boiling component and third component exhaust line,
 500: a purified nitrogen fluoride drawing line,
 600: a refrigerant tank,
 700: a water sealing tank,
 800: a vacuum pump,
 900: a normal pressure exhaust line,
 100: a vacuum exhaust line,
 110: an insertion pipe, and
 120, 130, 140, 150, 160, and 170: valves.

THE BEST MODES OF CARRYING OUT THE INVENTION

The best modes of carrying out the present invention are described with reference to Examples. In the following Examples, and Comparative Examples, the percentages and parts per million quoted represent percent and part per million by volume. The method of analyzing the gases used in the Examples and Comparative Examples was gas chromatography.

EXAMPLE 1

$NF_3$ was produced by a molten salt electrolytic process using an apparatus shown in FIG. 3.

That is, after acid ammonium fluoride and hydrogen fluoride as raw materials were charged in prescribed amounts into an electrolytic cell 12, the mixture was heated to 130° to 135° C. to form an electrolytic bath 17 of an $NH_4F/HF$ system. Thereafter, while $N_2$ gas as a carrier gas was being introduced at a flow rate of 90 to 110 ml/min through a carrier gas introducing pipe 20 into an anode chamber 18, and was also being introduced at a flow rate of 80 to 90 ml/min through a carrier gas introducing pipe 21 into a cathode chamber 19, and the electrolytic bath 17 was kept at the above mentioned temperature, an electric current of 50 amperes was passed from an anode 14 to a cathode 15 to carry out the electrolysis. About 80 ml of $NF_3$ gas per min and about 350 ml of H$_2$ gas per min were released from the cathode and the anode respectively.

The H$_2$ gas containing the carrier gas (N$_2$) generated at the cathode was discharged into the atmosphere through a hydrogen gas discharging pipe 25.

On the other hand, the NF$_3$ gas containing the carrier gas (N$_2$), etc. generated at the anode was led into an HF eliminating apparatus 31 via a piping 24, where the contained HF was eliminated, and then the NF$_3$ gas was led into the collecting container 1 via an introducing pipe 2.

The collecting container 1 was previously cooled with it immersed in a refrigerant (liquid nitrogen) 11 that filled a refrigerant tank 10 as shown in FIG. 3.

As stated above, the NF$_3$ gas containing N$_2$ gas, etc. was introduced into the cooled collecting container 1, and He gas as an additive gas was also introduced at a flow rate of 40 to 50 ml/min through an introducing pipe 3 into the cooled collecting container 1 thereby liquefying and condensing the NF$_3$. The liquefied NF$_3$ was stored in the collecting container 1, and the He gas, the N$_2$ gas, etc. were discharged through an exhaust pipe 4, and a sealing tank 32 from an exhaust gas atmosphere discharging pipe 34 into the atmosphere.

During that the concentration of the H$_2$ in the anode chamber 18 of the electrolytic cell 12 was measured continuously by a hydrogen gas concentration meter, and it was found that, at the point when 100 hours had passed since the start of the electrolysis, the H$_2$ concentration was less than 1%, and the state was enough to allow the electrolysis to be carried out further.

EXAMPLE 2

Example 1 was repeated, except that as the carrier gas to be introduced to the anode a mixed gas of N$_2$ at a flow rate of 90 to 110 ml/min, and He (an additive gas) at a flow rate of 40 to 50 ml/min was used, as the carrier gas to be introduced to the cathode N$_2$ was introduced at a flow rate of 120 to 140 ml/min, and other additive gas was not introduced into the liquefying/condensing step, thereby carrying out the electrolysis and the liquefaction/condensation of the NF$_3$.

The H$_2$ concentration in the anode chamber 18 of the electrolytic cell 12 at the point when 100 hours had passed since the start of the electrolysis was less than 1% similarly to Example 1, and the state was enough to allow the electrolysis to be carried out further.

EXAMPLE 3

Example 1 was repeated, except that Ne gas was used as the additive gas to be introduced into the collecting container 1, thereby carrying out the electrolysis and the liquefaction/condensation of the NF$_3$.

The H$_2$ concentration in the anode chamber 18 of the electrolytic cell 12 at the point when 100 hours had passed since the start of the electrolysis was less than 1% similarly to Example 1, and the state was enough to allow the electrolysis to be carried out further.

COMPARATIVE EXAMPLE 1

Example 1 was repeated, except that the introduction of the additive gas to the collecting container 1 was stopped, thereby carrying out the electrolysis, and the liquefaction/condensation of the NF$_3$. After 2 hours of the start of the electrolysis, the H$_2$ gas concentration in the anode chamber 18 of the electrolytic cell 12 increased to about 5% and reached near the explosion limit, and the state became very dangerous, so that it could not help stopping the electrolysis.

EXAMPLE 4

Crude nitrogen trifluoride (NF$_3$) that had been subjected to adsorption operation by using commercially available active alumina (in the form of particles having a pore diameter of 5 Å, and a particle diameter of 24 to 48 mesh) to eliminate N$_2$O, CO$_2$, etc. thereby having the qualities shown in Table 1 was purified by deeply cooled distillation using the apparatus shown in FIG. 10.

That is, after the insulating container 600 was filled with liquid nitrogen to cool the collecting container (having an internal volume of 1 l) 100, the gaseous NF$_3$ having the qualities shown in Table 1, and helium gas as a third component were fed at a flow rate of 50 ml/min and a flow rate of 3 ml/min respectively into the collecting container through the lines 200 and 300. The NF$_3$ liquefied in the collecting container, and the helium gas that was made copresent and fractionally distilled gaseous low-boiling components (oxygen, nitrogen, etc.) were discharged through the water sealing tank 700. (Thus, the inside of the system was kept approximately at the atmospheric pressure.)

When the feed of the NF$_3$ gas reached 100 g, the valves 120 and 130 were closed to stop the feed of the NF$_3$ gas and helium gas, then after the valve 160 on the way to the water sealing tank 700 was closed, the valve 170 was opened to exhaust the gaseous low-boiling components and helium gas in the system by the vacuum pump 800. After the completion of the exhaustion, the temperature of the collecting container 100 was brought to the normal temperatures, and the liquefied NF$_3$ in the collecting container 100 was made gaseous and was analyzed. The results are as shown in Table 2 that oxygen and nitrogen were eliminated considerably.

EXAMPLE 5

Example 3 was repeated using the apparatus (FIG. 10) used in Example 4, except that, instead of exhausting the helium gas and the gaseous low-boiling components generated by the deeply cooled distillation by passing them through the water sealing tank 700, they were exhausted through the line 100 by using the vacuum pump 800 to reduce the pressure in the collecting container 100, thereby carrying out deeply cooled distillation of crude NF$_3$ having the qualities shown in Table 1. The pressure in the system at the time of the deeply cooled distillation was 10 mm Hg abs. The NF$_3$ in the collecting container 100 was made gaseous and analyzed. The results are as shown in Table 2 that the contents of oxygen and nitrogen were reduced far more than in Example 4.

EXAMPLE 6

In the apparatus shown in FIG. 10, the apparatus was remodeled in such a manner that the insertion pipe 110 was extended to the bottom of the collecting container 100 so that helium gas might be bubbled into liquefied NF$_3$.

After the insulating container 600 was filled with liquid nitrogen to cool the collecting container 100, 100 g of gaseous crude NF$_3$ having the qualities shown in Table 1 were fed into the collecting container 100 and were liquefied in the collecting container 1. Helium gas was fed at a flow rate of 100 ml/min into the liquefied crude NF$_3$ for 30 min to bubble. The helium gas and evaporated low-boiling components were exhausted through the water sealing tank 700 in the same way as in Example 1 (the pressure in the system was at the atmospheric pressure). The volume ratio of He/NF$_3$ was about 0.1.

Then, in the same way as in Example 4, the inside of the system was exhausted by the vacuum pump 800 to remove the copresent gas. The obtained liquefied NF$_3$ was made gaseous and was analyzed in the same way as in Example 4. The results are as shown in Table 2 that oxygen and nitrogen were eliminated considerably, thereby giving highly pure NF$_3$.

EXAMPLE 7

Example 6 was repeated, except that the was used when bubbling was effected using helium gas, and the pressure in the system at the time of the bubbling was 100 mm Hg abs. The analysis of the obtained NF$_3$ gas is shown in Table 2. Thus, very highly pure NF$_3$ gas containing trace amounts of oxygen and nitrogen was obtained.

TABLE 1

| Amounts of impurities in the raw crude NF$_3$ | |
|---|---|
| | Content of impurity |
| N$_2$O | not over 10 ppm |
| CO$_2$ | not over 10 ppm |
| O$_2$ | 2.3% |
| N$_2$ | 6.6% |

TABLE 2

| | Contents of impurities | | | |
|---|---|---|---|---|
| | Example 4 | Example 5 | Example 6 | Example 7 |
| N$_2$O | not over 10 ppm | not over 10 ppm | not over 10 ppm | not over 10 ppm |
| CO$_2$ | not over 10 ppm | not over 10 ppm | not over 10 ppm | not over 10 ppm |
| O$_2$ | 920 ppm | 106 ppm | 260 ppm | 2 ppm |
| N$_2$ | 1890 ppm | 203 ppm | 510 ppm | 10 ppm |

COMPARATIVE EXAMPLE 2

Example 4 was repeated, except that the feed of helium gas that was the third component was stopped. The contents of oxygen and nitrogen in the obtained NF$_3$ gas were as shown in Table 3, indicating that they were scarcely eliminated.

COMPARATIVE EXAMPLE 3

Example 5 was repeated, except that the feed of helium gas was stopped. The contents of oxygen and nitrogen in the obtained NF$_3$ gas were as shown in Table 3, indicating that the elimination rates were very poor though they were not so low as in Comparative Example 2.

Table 3

| | Contents of impurities | |
|---|---|---|
| | Comparative Example 2 | Comparative Example 3 |
| N$_2$O | not over 10 ppm | not over 10 ppm |
| CO$_2$ | not over 10 ppm | not over 10 ppm |
| O$_2$ | 1.0% | 0.5% |
| N$_2$ | 6.5% | 2.5% |

POSSIBILITY OF UTILIZATION IN INDUSTRY

According to the present method of liquefying and condensing NF$_3$, as a carrier gas itself a gas whose boiling point is lower than that of nitrogen such as He and/or Ne and that is not dissolved in liquid NF$_3$ is used in a reaction step in the production of NF$_3$, or He and/or Ne is contained in a carrier gas such as nitrogen gas other than He and Ne in the reaction step, or a mixed gas of NF$_3$ and a carrier gas is led into a step (liquefying/condensing step) of cooling NF$_3$ that follows the reaction step, and a gas such as He and/or Ne is added thereto, so that the NF$_3$ gas is liquefied and condensed in the copresence of such a gas, thereby providing a quite simple method.

In the conventional processes, H$_2$ gas mixed into the formed NF$_3$ gas, which attended a risk of explosion, and to prevent such a risk a long-term continuous operation was impossible, whereas by carrying out the present method, as shown in Examples, such a risk of explosion in the production of NF$_3$ can be obviated completely, a safe long-term continuous operation becomes possible, and therefore the possibility of the utilization of the present invention in the industry is high.

Further, according to the present method of purifying NF$_3$, a method is provided wherein crude NF$_3$ is subjected to deeply cooled distillation in the copresence of a third component that is incompatible with nitrogen fluoride such as helium, neon, and argon, and therefore it has become possible to eliminate low-boiling components such as O$_2$, and N$_2$ in crude NF$_3$ which could not be eliminated by the conventional purifying methods.

Further, as shown in Examples, if said deeply cooled distillation is carried out under reduced pressure, or in said deeply cooled distillation, if a third component is bubbled through the liquefied crude NF$_3$, low-boiling components can be separated and eliminated with quite good efficiency.

Impurities contained in crude NF$_3$ other than low-boiling components such as N$_2$O, and CO$_2$ can be eliminated by combining the present method with an other known purifying method wherein the crude NF$_3$ is brought in contact with an adsorbent such as active alumina and zeolites, so that quite highly pure nitrogen fluoride having for example a purity of 99.99% or over suitable for the application in the field of electronic materials can be provided.

Although 99.9% NF$_3$ can be used as a cleaning agent for CVD apparatuses in the field of electronic materials, it is preferable to use NF$_3$ having a purity of 99.99% or over because other gases used for CVD have a purity of 99.99% or over and if 99.9% NF$_3$ is used for CVD, it is considered that the furnace will be contaminated.

As dry etching gas for very large-scale integrated circuits, dry etching gases other than NF$_3$ having a purity of 99.99% or over cannot be used.

Such highly pure NF$_3$ has not been provided up to now, and meets well the recent desire in the field of electronic materials, and the possibility of the utilization in the industry is high.

We claim:

1. A method of liquefying and condensing nitrogen fluoride, which method comprises leading a mixed gas of nitrogen trifluoride and a carrier gas to a cooling step, cooling said mixed gas in the copresence of a gas whose boiling point is lower than that of nitrogen gas and that is not dissolved in liquid nitrogen trifluoride to obtain liquefied nitrogen trifluoride mainly comprising nitrogen trifluoride, and recovering the obtained liquefied nitrogen trifluoride.

2. The method as claimed in claim I, wherein the carrier gas comprises one or more gases selected from the group consisting of nitrogen, argon, helium, and neon.

3. The method as claimed in claim 1, wherein the nitrogen trifluoride gas is obtained by a molten salt electrolytic process.

4. The method as claimed in claim 2, wherein the nitrogen trifluoride gas is obtained by a molten salt electrolytic process that uses an electrolytic cell equipped with a partition of a fluorocarbon resin or a partition having surface coated with a fluorocarbon resin.

5. The method as claimed in claim 2, wherein a mixed gas of a carrier gas and nitrogen trifluoride gas obtained by a molten salt electrolytic process is continuously led into the cooling step.

6. The method as claimed in claim 1, wherein the gas whose boiling point is lower than that of nitrogen gas and that is not dissolved in liquid nitrogen trifluoride is copresent with nitrogen trifluoride in a volume ratio of 0.01 to 10 with respect to the nitrogen trifluoride.

7. The method according to claim 1 wherein in a preparing step of the nitrogen trifluoride, helium and/or neon comprising gas is used as a carrier gas to be introduced into the nitrogen trifluoride gas and the mixture of said carrier gas and the nitrogen trifluoride gas is led into the cooling step so that the helium gas and/or neon gas will be copresent with the nitrogen trifluoride gas.

8. The method according to claim 1 wherein in a preparing step of nitrogen trifluoride, nitrogen and/or argon gas is used as a carrier gas to be introduced into the nitrogen trifluoride gas, the mixed gas is led into the cooling step, and helium gas and/or neon gas is added to the cooling step so that the helium gas and/or neon gas will be copresent with the nitrogen trifluoride gas.

9. The method according to claim 1 wherein the gas whose boiling point is lower than that of nitrogen gas, and that is not dissolved in liquid nitrogen trifluoride comprises one or more gases selected from helium and neon.

10. The method of purifying nitrogen trifluoride, wherein nitrogen trifluoride gas mixed with impurity gases is cooled to be liquefied and is subjected to, or liquefied nitrogen trifluoride is subjected to deeply cooled distillation in the copresence of a third component gas whose boiling point is lower than that of nitrogen trifluoride, the deeply cooled distillation being carried out at a temperature ranging between up to the liquefying temperature of $NF_3$ and down to the solidifying temperature of $NF_3$ and at which the copresent third component will not liquefy, and that is not dissolved in liquid nitrogen trifluoride.

11. The method as claimed in claim 10, wherein the impurity gas is oxygen or nitrogen.

12. The method as claimed in claim 10, wherein the third component gas is selected from helium, argon, and neon.

13. The method as claimed in claim 10, wherein the third component gas is bubbled through the liquefied nitrogen trifluoride.

14. The method as claimed in claim 10, wherein the deeply cooled distillation is carried out under reduced pressure, the deeply cooled distillation being carried out at a temperature ranging between up to the liquefying temperature of $NF_3$ and down to the solidifying temperature of $NF_3$ and at which the copresent third component will not liquefy.

15. The method as claimed in claim 10, wherein the deeply cooled distillation is a single distillation, the deeply cooled distillation being carried out at a temperature ranging between up to the liquefying temperature of $NF_3$ and down to the solidifying temperature of $NF_3$ and at which the copresent third component will not liquefy.

16. The method as claimed in claim 10, wherein said nitrogen trifluoride is obtained by a molten salt electrolytic process.

17. The method as claimed in claim 16, wherein said nitrogen is obtained by a molten salt electrolytic process that uses an electrolytic cell equipped with a partition of a fluorocarbon resin or a partition having surfaces coated with a fluorocarbon resin.

18. The method as claimed in claim 10, wherein a third component gas to nitrogen trifluoride volume ratio is 0.01 to 10.

* * * * *